US008361640B2

(12) United States Patent
Ono et al.

(10) Patent No.: US 8,361,640 B2
(45) Date of Patent: Jan. 29, 2013

(54) MAGNETIC RECORDING MEDIUM HAVING ION-IMPLANTED PARTS

(75) Inventors: Toshinori Ono, Tokyo (JP); Hiroshi Kanai, Kanagawa-ken (JP); Tatsuysa Hinoue, Kanagawa (JP); Hiroyuki Suzuki, Kanagawa (JP); Hiroshi Inaba, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 453 days.

(21) Appl. No.: 12/378,894

(22) Filed: Feb. 20, 2009

(65) Prior Publication Data
US 2009/0213497 A1 Aug. 27, 2009

(30) Foreign Application Priority Data

Feb. 22, 2008 (JP) ................................. 2008-042021

(51) Int. Cl.
*G11B 5/66* (2006.01)

(52) U.S. Cl. ...................... 428/828.1; 428/829; 428/832

(58) Field of Classification Search ........................ None
See application file for complete search history.

(56) References Cited

U.S. PATENT DOCUMENTS

| 6,055,139 | A | 4/2000 | Ohtsuka et al. |
| 6,665,145 | B2* | 12/2003 | Wada ............................. 360/133 |
| 7,311,983 | B2 | 12/2007 | Watanabe et al. |
| 7,405,011 | B2 | 7/2008 | Stipe et al. |
| 7,471,484 | B2* | 12/2008 | Wachenschwanz et al. ........................... 360/77.07 |
| 7,608,193 | B2* | 10/2009 | Wachenschwanz et al. .... 216/22 |
| 7,615,292 | B2* | 11/2009 | Ito et al. ...................... 428/831.2 |
| 7,670,696 | B2* | 3/2010 | Fullerton et al. .............. 428/834 |
| 8,257,845 | B2* | 9/2012 | Hinoue et al. ............. 428/828.1 |
| 2005/0214583 | A1 | 9/2005 | Ito et al. |
| 2006/0040140 | A1* | 2/2006 | Kaizu et al. .................... 428/829 |
| 2006/0222898 | A1 | 10/2006 | Ichihara |
| 2007/0042226 | A1* | 2/2007 | Marinero et al. ............. 428/831 |
| 2007/0218318 | A1* | 9/2007 | Watanabe ..................... 428/832 |
| 2007/0224455 | A1* | 9/2007 | Iida et al. ................... 428/831.2 |
| 2008/0075845 | A1* | 3/2008 | Sonobe et al. ................ 427/130 |
| 2008/0292907 | A1* | 11/2008 | Berger et al. ................. 428/828 |

(Continued)

FOREIGN PATENT DOCUMENTS

| JP | 05205257 | 8/1993 |
| JP | 8096340 A | 4/1996 |

(Continued)

OTHER PUBLICATIONS

Derwent Abstract Translation of WO 2009/041286 A1; Published Apr. 2, 2009.*

*Primary Examiner* — Kevin Bernatz (57) ABSTRACT

Embodiments of the present invention provide recording area separated magnetic recording media (DTMs, BPMs) allowing magnetic heads to fly lower. According to one embodiment, the recording area separated magnetic recording media are configured so that magnetic recording layers have parts with the relatively higher element ratio of a ferromagnetic material, and parts with the lower element ratio of the ferromagnetic material, occurring periodically in the in-plane direction, and the average height from the substrate surface of the parts with the relatively higher element ratio of a ferromagnetic material is higher than the average height from the substrate surface of the parts with the lower element ratio of the ferromagnetic material. In producing recording area separated magnetic recording media with the element ratio of a ferromagnetic material relatively lowered by ion implantation, preliminarily etching the part to be ion implanted makes the height after ion implantation relatively lower than the non-implanted part.

12 Claims, 7 Drawing Sheets

U.S. PATENT DOCUMENTS

| | | | |
|---|---|---|---|
| 2009/0123660 A1* | 5/2009 | Inaba et al. | 427/535 |
| 2009/0202865 A1* | 8/2009 | Kimura et al. | 428/828 |
| 2009/0214895 A1 | 8/2009 | Hinoue et al. | |
| 2009/0214898 A1 | 8/2009 | Hinoue et al. | |
| 2010/0084374 A1* | 4/2010 | Kimura et al. | 216/22 |

FOREIGN PATENT DOCUMENTS

| | | |
|---|---|---|
| JP | 9167336 | 6/1997 |
| JP | 3034879 | 4/2000 |
| JP | 2000268340 A | 9/2000 |
| JP | 2002288813 A | 10/2002 |
| JP | 2004005915 A | 1/2004 |
| JP | 20006019000 A | 1/2006 |
| JP | 2006-309841 | 11/2006 |
| JP | 2007-220164 | 8/2007 |
| JP | 2007-226862 | 9/2007 |

* cited by examiner

MAGNETIC RECORDING MEDIUM HAVING ION-IMPLANTED PARTS

CROSS-REFERENCE TO RELATED APPLICATION

The instant nonprovisional patent application claims priority to Japanese Patent Application No. 2008-042021 filed Feb. 22, 2008 and which is incorporated by reference in its entirety herein for all purposes.

BACKGROUND OF THE INVENTION

Magnetic disk devices used in mainframe computers, workstations, personal computers, and the like have become more important year by year, and have been improved in capacity increase and size reduction. For increased capacity and size reduction in those magnetic disk devices, higher density is crucial. One of such techniques for attaining higher density is reduction in media noise by a smaller unit of magnetization reversal in magnetic recording media. To that end, conventional magnetic recording media have adopted a configuration in which ferromagnetic crystal grains comprising a magnetic recording layer are preliminarily separated by a nonmagnetic material contained in the magnetic recording layer.

Today, to control separators more actively to improve magnetic recording density, discrete track media (DTMs) in which recording tracks are separated, and further, bit patterned media (BPMs) in which recording bits are separated, have been researched and developed. In both of these media, the processing technology to form the separators is a significant point for higher recording density.

As a method for producing a DTM, the magnetic layer processing type has been proposed that physically processes magnetic films by etching, for example. The magnetic film processed DTM are typically produced by the following processes:

(1) Provide a metal thin film on a recording medium and applying resist on top of it.
(2) Form a fine pattern on the resist according to the lithography technology.
(3) Etch the metallic thin film in concave part of the resist pattern by a dry etching process to expose a recording layer.
(4) Etch the exposed recording layer by a dry etching process to form recording track separators (grooves).
(5) Remove residual resist and the metallic thin film on recording tracks (lands).
(6) Backfill the grooves with a nonmagnetic material to planarize them.
(7) Provide a protection layer and a lubricant layer.

In this way, in production of the magnetic layer processed DTMs, process steps are very complicated, and further, the backfilled and planarized surfaces are rougher than those of continuous media, which disadvantageously causes unstable flying performance of magnetic heads.

For another method of producing DTMs to overcome the above problem, a technique has been proposed that demagnetizes grooves by ion implantation. According to Japanese Patent Publication No. 2007-226862, a fine pattern is placed on a magnetic recording medium formed up to a protection layer, and ions of Si, In, B, P, C, and F are implanted by a commercially available ion implanter. According to Japanese Patent Publication No. 2006-309841, DTMs can be produced by implanting ions of Ag, B, Cr, Mo, Al, Nb, or the like through a stencil mask. According to Japanese Patent Application Publication No. 2007-220164, a method of producing DTMs is disclosed that deposits Si on a fine processed concave part of a resist and selectively diffuses the Si in the pre-groove area on the recording layer. According to these disclosures, the manufacturing methods are simpler than that of the magnetic film processed DTMs and the flying performance of a magnetic head is better because of the smoothness of the surfaces of the prepared media.

Production of DTMs by ion implantation, however, has a problem of increased volume of the implanted part. That is, the part where the element ratio of a ferromagnetic material was relatively reduced by ion implantation increases in volume to cause increase in height compared with the non-implanted part. Thus, it may cause increase in distance between the non-implanted part corresponding to the magnetic recording tracks and the magnetic head. Consequently, the increase in spacing loss may interfere with higher recording density.

For example, when the recording layer made of a Co alloy having a thickness of 20 nm, there exist approximately $10^{17}$ atoms per $cm^2$. When Cr ions of $10^{16}$ atoms are implanted for the purpose of deterioration in magnetic characteristics, the volume increases by 10% if the density remains relatively constant. The implanted ions spread in the in-plane direction within the magnetic layer so that the height increases as a whole, but the height in the implanted part increases more than the non-implanted part so that the distance from the magnetic head in the non-implanted part (magnetic recording tracks) becomes longer than in the implanted part. To reduce the medium noise in read and write operations by a magnetic head, it is more advantageous if the difference in magnetic characteristics between the implanted part and the non-implanted part is larger. On the contrary, increase in dose for this purpose causes a notable increase in volume to disadvantageously increase the spacing loss.

BRIEF SUMMARY OF THE INVENTION

Embodiments of the present invention provide recording area separated magnetic recording media (DTMs, BPMs) allowing magnetic heads to fly lower. According to the embodiment of FIG. 5, the recording area separated magnetic recording media are configured so that magnetic recording layers 6 and 7 have parts with the relatively higher element ratio of a ferromagnetic material and parts 13 with the lower element ratio of the ferromagnetic material occurring periodically in the in-plane direction, and the average height from the substrate surface of the parts with the relatively higher element ratio of a ferromagnetic material is higher than the average height from the substrate surface of the parts with the lower element ratio of the ferromagnetic material. In producing recording area separated magnetic recording media with the element ratio of a ferromagnetic material relatively lowered by ion implantation, preliminarily etching the part to be ion implanted makes the height after ion implantation relatively lower than the non-implanted part.

DETAILED DESCRIPTION OF THE INVENTION

Embodiments of the present invention relate to patterned media suitable for high recording density represented by discrete track media and bit patterned media and a method of manufacturing thereof.

Embodiments of the present invention help to overcome the above problems and provide recording area separated magnetic recording media (DTMs, BPMs) optimum for lower flying of a magnetic head.

Embodiments of the present invention provide a method of manufacturing recording area separated magnetic recording media (DTMs, BPMs) optimum for lower flying of a magnetic head.

To overcome the above problems, embodiments of the present invention may adopt the following configuration. Namely, according to embodiments of the present invention, in a magnetic recording medium comprising a base and a magnetic recording layer formed directly or with at least an intermediate layer interposed on the substrate, the magnetic recording layer includes parts with a relatively higher element ratio of a ferromagnetic material and parts with a relatively lower element ratio of a ferromagnetic material which are provided periodically in the in-plane direction, and an average height from a substrate surface of the parts with a relatively higher element ratio of a ferromagnetic material is higher than an average height from the substrate surface of the parts with a relatively lower element ratio of a ferromagnetic material.

Moreover, according to embodiments of the present invention, recording area separated magnetic recording media suitable for higher recording density can be achieved by lowering the average height from the substrate surface of the parts to be ion implanted than the average height from the substrate surface of the ion non-implanted parts by 0.1 nm or more to 3 nm or less in an ion-implanted type of recording area separated magnetic recording medium. Lowering the average height from the substrate surface of the parts to be ion-implanted than the average height from the substrate surface of the ion non-implanted parts allows a flying reference surface hs of a magnetic head to become the height corresponding to the area ratio between the parts to be ion implanted and the ion non-implanted parts. Specifically, assuming the higher parts have a height of h1 and an area ratio of S1 and the lower parts have a height of h2 and an area ratio of S2, the hs is given by $h1 \times S1 + h2 \times S2$ where $h1 > hs > h2$. Accordingly, the distance between the non-implanted parts or magnetic recording tracks and the magnetic head can be reduced compared with h1, which can be regarded as the flying reference surface of the continuous media. The reason of the amount of 0.1 nm or more is based on the result that the amount of 0.1 nm or more indicates a substantial closeness of the magnetic head and the reason of the amount of 3 nm or less is based on the result that the larger amount than 3 nm will cause a problem with the flying stability of the magnetic head.

To achieve the above described configuration, in producing the recording area separated magnetic recording media for relatively lowering the element ratio of a ferromagnetic material by ion implantation using a mask layer which has a fine pattern and is provided directly or with one or more thin films interposed on the magnetic recording layer, preliminarily etching the parts to be ion implanted allows the height after the ion implantation to be relatively lower than the parts non-implanted by the range of 0.1 nm or more to 3 nm or less.

A discrete track medium can be produced by forming more concentrated parts and less concentrated parts of the nonmagnetic element in the magnetic recording layer substantially concentrically. A bit patterned medium can be produced by forming less concentrated parts of the nonmagnetic element in the magnetic recording layer in dot shape arranged like islands.

An element selected from a group consisting of Cr, Mo, W, V, Nb, Ta, Ti, Zr, Hf, Ru, B, C, Si, Ge, Ar, Kr, Rn, and Xe may be used as an element to be ion implanted.

According to embodiments of the present invention, in producing recording area separated magnetic recording media, which is aimed to improve recording density, by the ion implantation method, volume increase of the implanted part causing increase in spacing between recording area and a magnetic head (spacing loss) to interfere with improvement in recording density can be eliminated and smaller spacing loss can be achieved.

Hereinafter, embodiments of the present invention will be described in detail.

Figure 1:
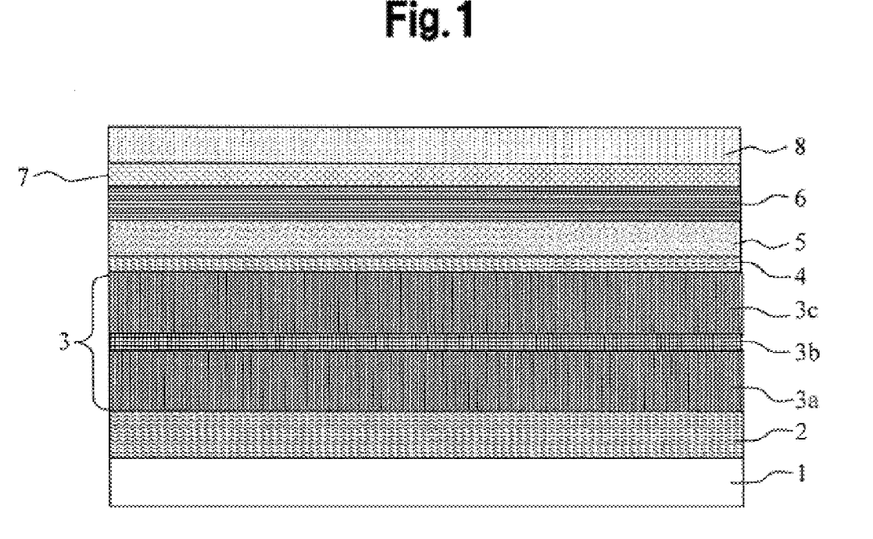
FIG. 1 is a cross-sectional schematic showing a manufacturing step of a magnetic disk according to an embodiment of the present invention.

FIG. 1 is a cross-sectional schematic illustrating a producing step of recording area separated magnetic recording media according to an embodiment of the present invention. A magnetic recording medium (magnetic disk) comprises an AlTi adhesion layer 2, a soft magnetic layer 3, a NiW seed layer 4, a Ru intermediate layer 5, a Co based alloy granular magnetic layer (recording layer 1) 6, a Co based alloy magnetic layer (recording layer 2) 7, and a Ta pre-mask layer 8, which are formed on each side of a nonmagnetic substrate (substrate) 1. The soft magnetic layer 3 is a laminated film of a FeCo based lower soft magnetic layer 3a, a Ru antiferromagnetic coupling layer 3b, and a FeCo based upper soft magnetic layer 3c.

Up to the step of forming the Ta pre-mask layer 8 on the nonmagnetic substrate 1, a common manufacturing method was performed as described below.

First, soda lime glass substrates (65 mm in outer diameter, 15 mm in inner diameter, 0.635 mm in thickness) to be used as substrates 1 were sufficiently washed. The substrates were introduced into a vacuum chamber discharged to about $1.3 \times 10^{-5}$ Pa ($1.0 \times 10^{-7}$ Torr) or less. They were first transferred to a adhesion layer forming chamber and Al-50 at % Ti adhesion layers 2 in the thickness of 5 nm were formed in Ar atmosphere at about 0.8 Pa (6 mTorr) by the DC magnetron sputtering method. Next, they were transferred to a lower soft magnetic layer forming chamber and Fe-35 at % Co-9 at % Ta-4 at % Zr alloy lower soft magnetic layers 3a in the thickness of 25 nm were formed in Ar atmosphere at about 0.8 Pa (6 mTorr) by the DC magnetron sputtering method. Then, they were transferred to an antiferromagnetic coupling layer forming chamber and Ru layers 3b in the thickness of 0.5 nm were formed in Ar atmosphere at about 0.8 Pa (6 mTorr) by the DC magnetron sputtering method. Then, they were transferred to an upper soft magnetic layer forming chamber and Fe-35 at % Co-9 at % Ta-4 at % Zr alloy upper soft magnetic layers 3c in the thickness of 25 nm were formed in Ar atmosphere at about 0.8 Pa (6 mTorr) by the DC magnetron sputtering method.

Then, the substrates were transferred to a substrate cooling chamber and the substrate temperature which had been increased by the heat caused by the sputtering was lowered to 55° C. After that, they were transferred to a seed layer forming chamber and Ni-8 at % W seed layers 4 in the thickness of 8 nm were formed in Ar atmosphere at about 0.9 Pa (7 mTorr) by the DC magnetron sputtering method. The substrates were transferred to an intermediate layer forming chamber and Ru intermediate layers 5 in the thickness of 15 nm were formed in Ar atmosphere at about 2 Pa (15 mTorr) by the DC magnetron sputtering method. Further, the substrates were transferred to a first magnetic recording layer forming chamber and granular magnetic layers (recording layers 1) 6 made of 90 mol % (Co-15 at % Cr-18 at % Pt) 8 mol % $SiO_2$ alloy in the thickness of 13 nm were formed in Ar atmosphere at about 0.9 Pa (7 mTorr) by the DC magnetron sputtering method and then transferred to a second magnetic recording layer forming chamber and Co-13 at % Cr-18 at % Pt-7 at % B magnetic layers (recording layers 2) 7 in the thickness of 6 nm were formed in Ar atmosphere at about 0.8 Pa (6 mTorr) by the DC magnetron sputtering method. Then, they were transferred to a Ta pre-mask layer forming chamber and Ta pre-mask layers 8 in the thickness of 30 nm were formed in Ar atmosphere at about 0.9 Pa (7 mTorr) by the DC magnetron sputtering method.

As the substrate 1, a substrate made of chemically strengthened aluminosilicate, a Ni—P electroless deposited Al—Mg alloy substrate, or a nonmagnetic rigid substrate of ceramics is made of silicon, borosilicate glass, or the like, or a nonmagnetic rigid substrate made of glass glazed ceramics, or the like, can be used instead of the soda lime glass substrate.

The adhesion layer 2 is provided to prevent electrochemical elution of alkali metal from soda lime glass or to improve adhesiveness between the glass and the soft magnetic layer 3; NiTa, AlTa, CrTi, CoTi, NiTaZr, NiCrZr, CrTiAl, CrTiTa, CoTiNi, or CoTiAl may be used instead of AlTi, and the thickness may be arbitrary. Otherwise, the adhesion layer may be omitted, if not necessary.

A pinned layer may be provided between the adhesion layer 2 and the soft magnetic layer 3. As a typical configuration, 6 nm of Ni-18 at % Fe, 17 nm of Fe-50 at % Mn, and 3 nm of Co-10 at % Fe are deposited in this order on the adhesion layer 2, and then the soft magnetic layer 3 was provided. For the seed layer 4, a NiFe alloy, a NiTa alloy, a TaTi alloy, or the like may be used. Between the seed layer 4 and the soft magnetic layer 3, a CrTi alloy may be stacked. The substrate cooling step may be provided before forming the upper soft magnetic layer 3c or forming the recording layer 6 instead of after forming the upper soft magnetic layer 3c, and further, a plurality of these may be combined.

Figure 2:
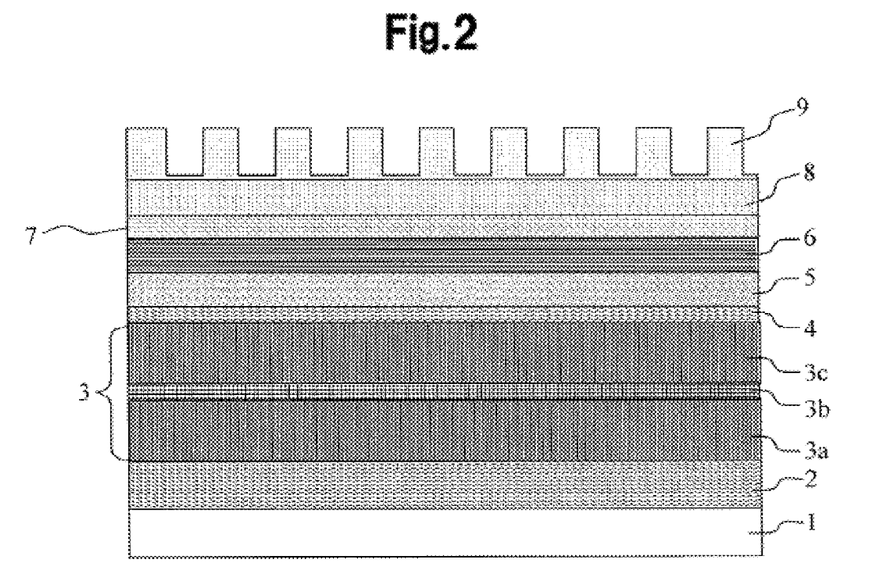
FIG. 2 is a cross-sectional schematic showing a manufacturing step of a magnetic disk according to an embodiment of the present invention.

The substrates 1 formed up to the Ta pre-mask layer 8 were taken out of the vacuum chamber and put in a resist coating apparatus. After forming 80-nm methyl methacrylate resin (PMMA) layers 9 on the Ta pre-mask layers as resist material, desired fine patterns shown in FIG. 2 were formed according to the nanoinprinting technology. That is, a stamper used in forming the fine pattern includes an area to stamp to form concentric convex parts of 60 nm in width, concave parts of 40 nm in width, and residues of 5 nm in the resist.

Figure 3:
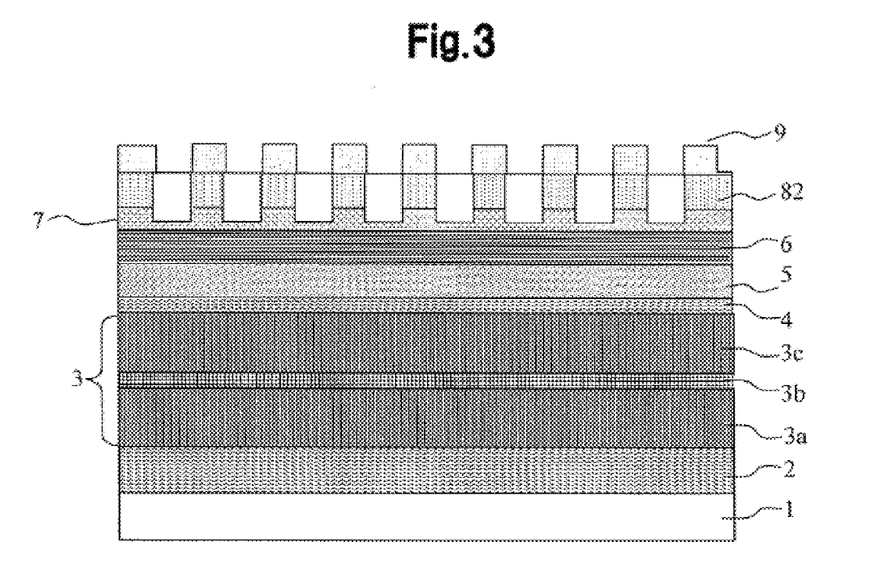
FIG. 3 is a cross-sectional schematic showing a manufacturing step of a magnetic disk according to an embodiment of the present invention.
Figure 4:
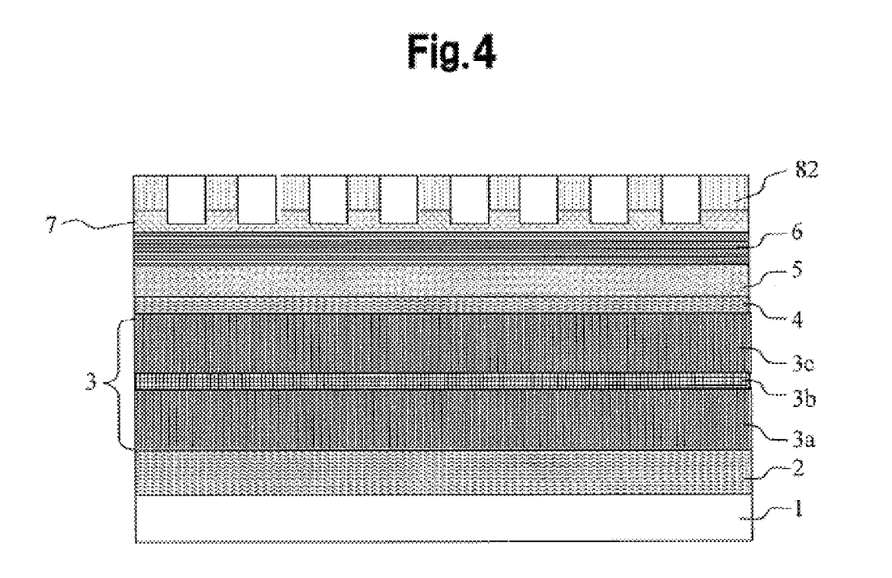
FIG. 4 is a cross-sectional schematic showing a manufacturing step of a magnetic disk according to an embodiment of the present invention.

Next, the substrates prepared up to the PMMA layers 9 having the above-described fine patterns were introduced into another vacuum apparatus different from the one used in forming up to the Ta pre-mask layers 8, and Ta mask layers 82 were formed. First, the substrates were transferred into a reactive oxygen ion etching (RIE-$O_2$) chamber and resist residues of 5 nm were removed. Next, they were transferred into an Ar ion beam etching (IBE) chamber, the 30 nm of Ta pre-mask layers under the parts where the resists were removed were entirely removed, and also the Co based alloy magnetic layers (recording layers 2) 7 were etched by several nanometers. On this occasion, several pieces each of several kinds of samples were prepared varying the etching depth. They were used in the evaluation or in the ion implantation step which will be described later. Besides, for the purpose of comparison, samples in which only the 30 nm Ta pre-mask layers were etched but the Co based alloy magnetic layers (recording layers 2) 7 were not etched were prepared and evaluated simultaneously. FIG. 3 shows the cross-sectional schematic of the magnetic recording medium according to an embodiment of the present invention processed up to the above-described steps. Without taking out the substrates from the vacuum chamber, the substrates were successively transferred into a reactive oxygen ion etching (RIE-$O_2$) chamber and the entire PMMA layers 9 were removed to form the Ta mask layers 82 shown in FIG. 4. If the Ta pre-mask layers under the parts where the resists had been removed were removed by the Ar ion beam etching and all the PMMA layers 9 were removed simultaneously with etching the Co based alloy magnetic layers (recording layer 2) 7, the reactive oxygen ion etching (RIE-$O_2$) may be omitted.

One piece each of the several kinds of samples, which were formed up to the Ta mask layer, were evaluated on the height of the etched part of the Co based alloy magnetic layer (recording layer 2) 7 in reference to the unetched part using the atomic force microscopy (AFM).

Figure 5:
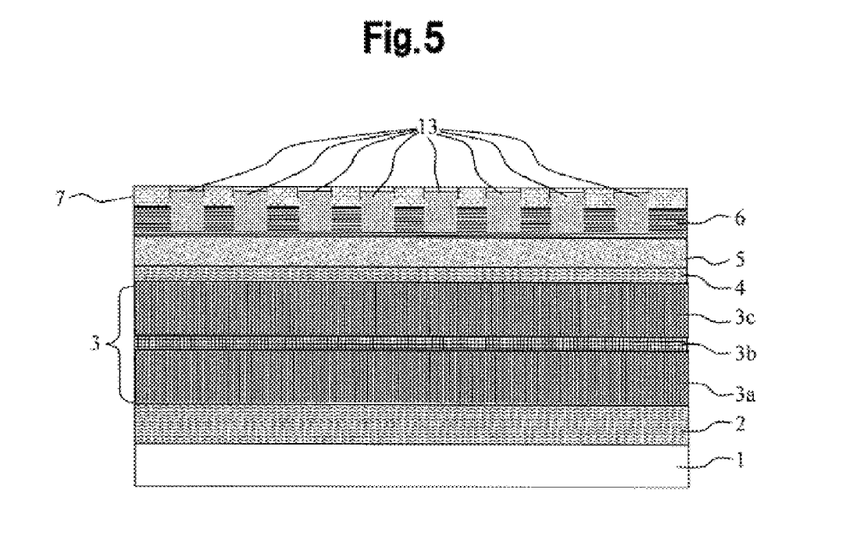
FIG. 5 is a cross-sectional schematic showing a manufacturing step of a magnetic disk according to an embodiment of the present invention.

Successively, the substrates formed up to the above Ta mask layer 82 were transferred to a Cr ion implantation chamber without being taken out of the vacuum chamber, except for the ones subjected to the AFM evaluation. The Cr ion implantation chamber is based on the plasma beam system equipped with the Cr arc discharge mechanism and the ion transfer mechanism by means of magnetic field filter and can apply a high DC pulse bias voltage to substrates. In embodiments of the present invention, Cr ions were implanted onto the whole of both surfaces of the substrates at a bias voltage of −20 kV. On this occasion, a plurality of pieces each of several kinds of samples were prepared, changing the dose by changing the implantation time. The substrates were successively transferred to a reactive $CF_4$ ion etching chamber and all the Ta mask layers were removed by $CF_4$ ion etching to have the configuration having ion implanted parts 13 as shown in FIG. 5. The relationship between the ion implantation time and the dose was based on the results preliminarily obtained by the Rutherford backward scattering analysis on Cr ion implanted Cr-free substrates. The mask layer may be etched in ion implantation. The mask layer removing step may be omitted, if the mask layer is vanished after the implantation according to the energy of implanted ion or the depth or the type of the masked layer.

One piece each of the several kinds of samples formed up to the ion implanted parts 13 were evaluated on the height of the ion implanted parts 13 of the Co based alloy magnetic layer (recording layer 2) 7 in reference to the non-implanted parts using an atomic force microscopy (AFM).

Figure 6:
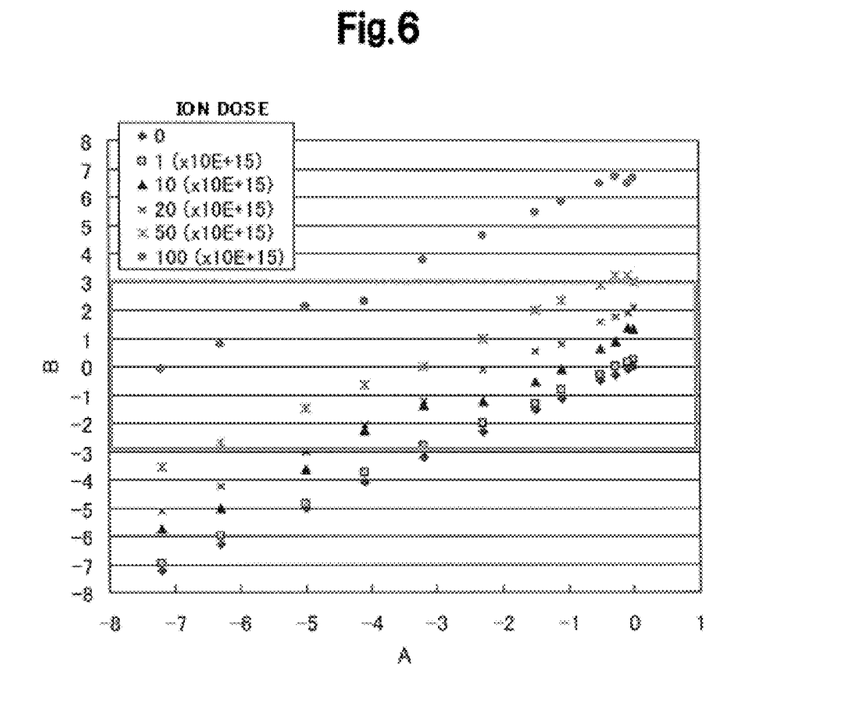
FIG. 6 is a drawing showing the relationship between the height of the etched part of the Co based alloy magnetic layer (recording layer 2) in reference to the unetched part and the height of an ion implanted part of a Co based alloy magnetic layer (recording layer 2) in reference to the non-implanted part in a DTM.

The relationship between the height of the etched part of the Co based alloy magnetic layer (recording layer 2) 7 in reference to the unetched part before the ion implantation, the height of the ion implanted part 13 of the Co based alloy magnetic layer (recording layer 2) 7 in reference to the non-implanted part after the ion implantation, and the ion dose are shown in TABLE 1 and FIG. 6. In TABLE 1 and FIG. 6, the value A represents the height (nm) of the etched part of the Co based alloy magnetic layer (recording layer 2) 7 in reference to the unetched part, the value B represents the height (nm) of ion implanted part 13 of the Co based alloy magnetic layer (recording layer 2) 7 in reference to the non-implanted part, and the value C represents the ion dose (($\times 10^{15}$) atoms/cm$^2$).

TABLE 1

IN DTM, VALUE B WHEN VALUE A AND ION DOSE WERE CHANGED (nm)

| A(nm) | C [(×10E+15)atoms/cm2] | | | | | |
|---|---|---|---|---|---|---|
| | 0 | 1 | 10 | 20 | 50 | 100 |
| 0 | 0 | 0.25 | 1.3 | 2.1 | 3 | 6.66 |
| −0.1 | −0.1 | 0.14 | 1.35 | 1.88 | 3.2 | 6.5 |
| −0.28 | −0.28 | −0.01 | 0.87 | 1.75 | 3.22 | 6.72 |
| −0.51 | −0.51 | −0.3 | 0.65 | 1.55 | 2.89 | 6.49 |
| −1.1 | −1.1 | −0.85 | −0.1 | 0.79 | 2.36 | 5.84 |
| −1.5 | −1.5 | −1.33 | −0.55 | 0.52 | 1.98 | 5.48 |
| −2.3 | −2.3 | −2 | −1.2 | −0.1 | 1 | 4.65 |
| −3.2 | −3.2 | −2.8 | −1.35 | −1.2 | 0 | 3.76 |
| −4.1 | −4.1 | −3.75 | −2.24 | −2.05 | −0.62 | 2.29 |
| −5 | −5 | −4.88 | −3.65 | −3 | −1.44 | 2.1 |
| −6.3 | −6.3 | −6 | −5.02 | −4.25 | −2.68 | 0.8 |
| −7.2 | −7.2 | −6.98 | −5.76 | −5.11 | −3.56 | −0.1 |

Successively, the substrates formed up to the ion implanted part 13 were transferred to a DLC protection film forming chamber, remaining in the vacuum chamber except for the ones subjected to the AFM evaluation, and then formed a 3 nm DLC protection film 10 in $C_2H_2$ atmosphere at about 10 Pa by the RF-CVD method.

Figure 7:
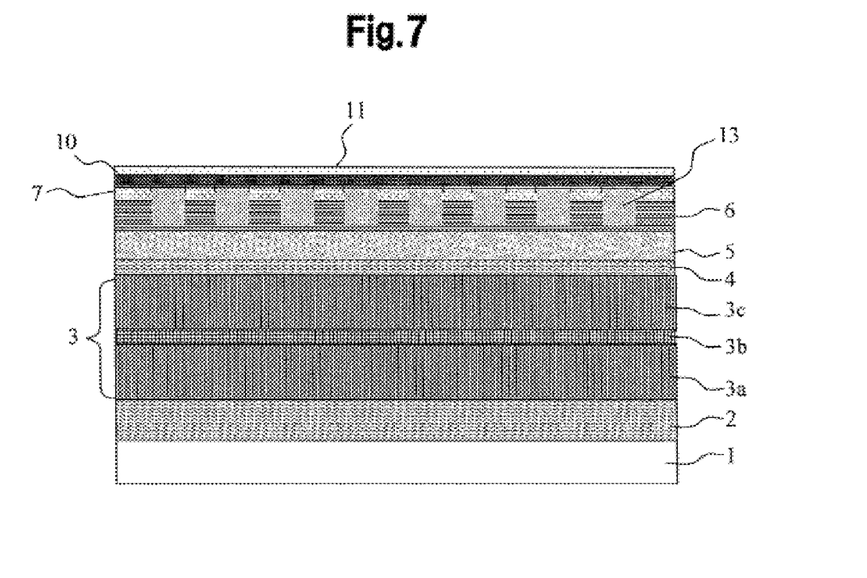
FIG. 7 is a cross-sectional schematic showing a manufacturing step of a magnetic disk according to an embodiment of the present invention.

Using a plurality of samples prepared by the above method, fluorocarbon based lubrication films 11 were provided on the DLC protection films 10 to have a configuration of the discrete track magnetic recording medium (DTM) shown in FIG. 7. The thickness was determined by a Fourier transfer infrared spectroscopy (FT-IR) and was made to be 1.0 nm in all the samples. Using the plurality of magnetic recording media with fluorocarbon based lubrication films 11, evaluation on the flying stability of a magnetic head and evaluation on the read and write (RW) performance using a spin-stand were conducted as follows.

For evaluation on the flying stability of magnetic recording media, glide noise (GN) by a head (glide head) having a piezo element was measured. The glide noise is the noise outputted from a piezo element while a glide head is flying over a magnetic recording medium. Large glide noise means that the slider is not flying over the magnetic recording medium stably.

The method of measuring the glide noise is as follows. The method made a magnetic head fly above a spinning magnetic recording medium and moved the radial position of the head above the magnetic recording medium from 16.5 mm to 41.5 mm by every 0.05 mm. At each radial position, it measured the noise of the piezo element during one spin of the magnetic recording medium and obtained the average. Moreover, it averaged the respective averages at the radial positions to define the value as the glide noise of the magnetic recording medium. In the present measurement, the fly-height of the glide head was 6 nm. Usually, the fly-height of a glide head varies with the relative speed to the spinning magnetic recording medium. To prevent the variation in fly-height, the method changed the number of spins of the magnetic recording medium at every movement of the glide head to control the relative speed so as to be constant even if the radial position changed. Although the voltage of the piezo element was outputted through an amplifier and a frequency divider, the method set the gain of the amplifier to 60 dB, the band of the frequency divider to from 100 kHz to 2 MHz. If the measured glide noise is 30 mV or less, it can be determined that the flying performance of the head is stable. If it is more than 30 V, it can be determined that the head is unstable and the magnetic recording medium is unsatisfactory.

Figure 8:
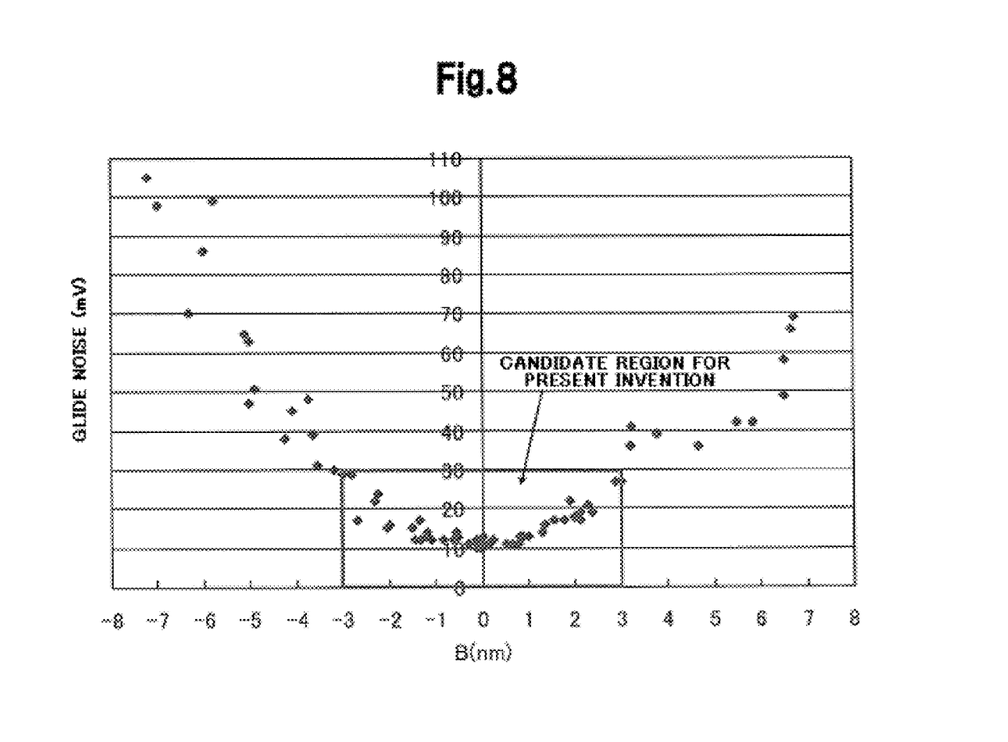
FIG. 8 is a drawing showing the relationship between the height of the ion implanted part of a Co based alloy magnetic layer (recording layer 2) in reference to the non-implanted part and the glide noise in a DTM.

Evaluation results on the glide noise are shown in TABLE 2 and FIG. 8. When the height of ion implanted part 13 of the Co based alloy magnetic layer (recording layer 2) 7 in reference to the non-implanted part ranges −3 nm or more to 3 nm or less, the glide noise is 30 mV or less, and when the difference in height is more than 3 nm, the glide noise is larger than 30 mV. That is to say, it was revealed that the surface shape is not suitable for a magnetic recording medium unless the height of ion implanted part 13 of the Co based alloy magnetic layer (recording layer 2) 7 in reference to the non-implanted part ranges from −3 nm or more to 3 nm or less.

TABLE 2

IN DTM, VALUE A VS VALUE B (nm) AND GLIDE NOISE

| A(nm) | C[(×10E+15)atoms/cm2] | | | | | | | | | | | |
|---|---|---|---|---|---|---|---|---|---|---|---|---|
| | 0 | | 1 | | 10 | | 20 | | 50 | | 100 | |
| | B | GN | B | GN | B | GN | B | GN | B | GN | B | GN |
| 0 | 0 | 11 | 0.25 | 12 | 1.3 | 14 | 2.1 | 19 | 3 | 27 | 6.66 | 66 |
| −0.1 | −0.1 | 12 | 0.14 | 11 | 1.35 | 16 | 1.88 | 22 | 3.2 | 36 | 6.5 | 58 |
| −0.28 | −0.28 | 11 | −0.01 | 10 | 0.87 | 13 | 1.75 | 17 | 3.22 | 41 | 6.72 | 69 |
| −0.51 | −0.51 | 13 | −0.3 | 11 | 0.65 | 11 | 1.55 | 17 | 2.89 | 27 | 6.49 | 49 |

TABLE 2-continued

IN DTM, VALUE A VS VALUE B (nm) AND GLIDE NOISE

| | C[(×10E+15)atoms/cm2] | | | | | | | | | | | |
|---|---|---|---|---|---|---|---|---|---|---|---|---|
| | 0 | | 1 | | 10 | | 20 | | 50 | | 100 | |
| A(nm) | B | GN | B | GN | B | GN | B | GN | B | GN | B | GN |
| −1.1 | −1.1 | 12 | −0.85 | 12 | −0.1 | 10 | 0.79 | 11 | 2.36 | 19 | 5.84 | 42 |
| −1.5 | −1.5 | 15 | −1.33 | 12 | −0.55 | 14 | 0.52 | 11 | 1.98 | 18 | 5.48 | 42 |
| −2.3 | −2.3 | 22 | −2 | 16 | −1.2 | 14 | −0.1 | 12 | 1 | 13 | 4.65 | 36 |
| −3.2 | −3.2 | 30 | −2.8 | 29 | −1.35 | 17 | −1.2 | 13 | 0 | 13 | 3.76 | 39 |
| −4.1 | −4.1 | 45 | −3.75 | 48 | −2.24 | 24 | −2.05 | 15 | −0.62 | 12 | 2.29 | 21 |
| −5 | −5 | 47 | −4.88 | 51 | −3.65 | 39 | −3 | 29 | −1.44 | 12 | 2.1 | 17 |
| −6.3 | −6.3 | 70 | −6 | 86 | −5.02 | 63 | −4.25 | 38 | −2.68 | 17 | 0.8 | 13 |
| −7.2 | −7.2 | 105 | −6.98 | 98 | −5.76 | 99 | −5.11 | 65 | −3.56 | 31 | −0.1 | 11 |

Next, the RW performance of samples with the height of ion implanted part 13 of the Co based alloy magnetic layers (recording layers 2) 7 in reference to the non-implanted part ranging from −3 nm or more to 3 nm or less was evaluated.

The method of evaluating the RW performance is as follows. The method made a magnetic head fly over a spinning magnetic recording medium and measured read/write performance of the head positioned at 21 mm in the radial position of the magnetic recording medium and having skew angle of 0°. The circumferential speed of the magnetic recording medium was set constant at 10 m/sec and the mechanical fly-height of the magnetic head was set at 4 nm above a continuous medium having a smooth surface. Defining the ratio of the output signal at 8.93 kilo flux change/mm (227 kFCI) to the output signal at 37 kilo flux change/mm (940 kFCI) as output resolution Re (Re(%)=S (940 kFCI)/S (227 kFCI)×100), the Re was evaluated. If the Re is greater, it can be said that the medium is more suitable for higher recording density.

Figure 9:
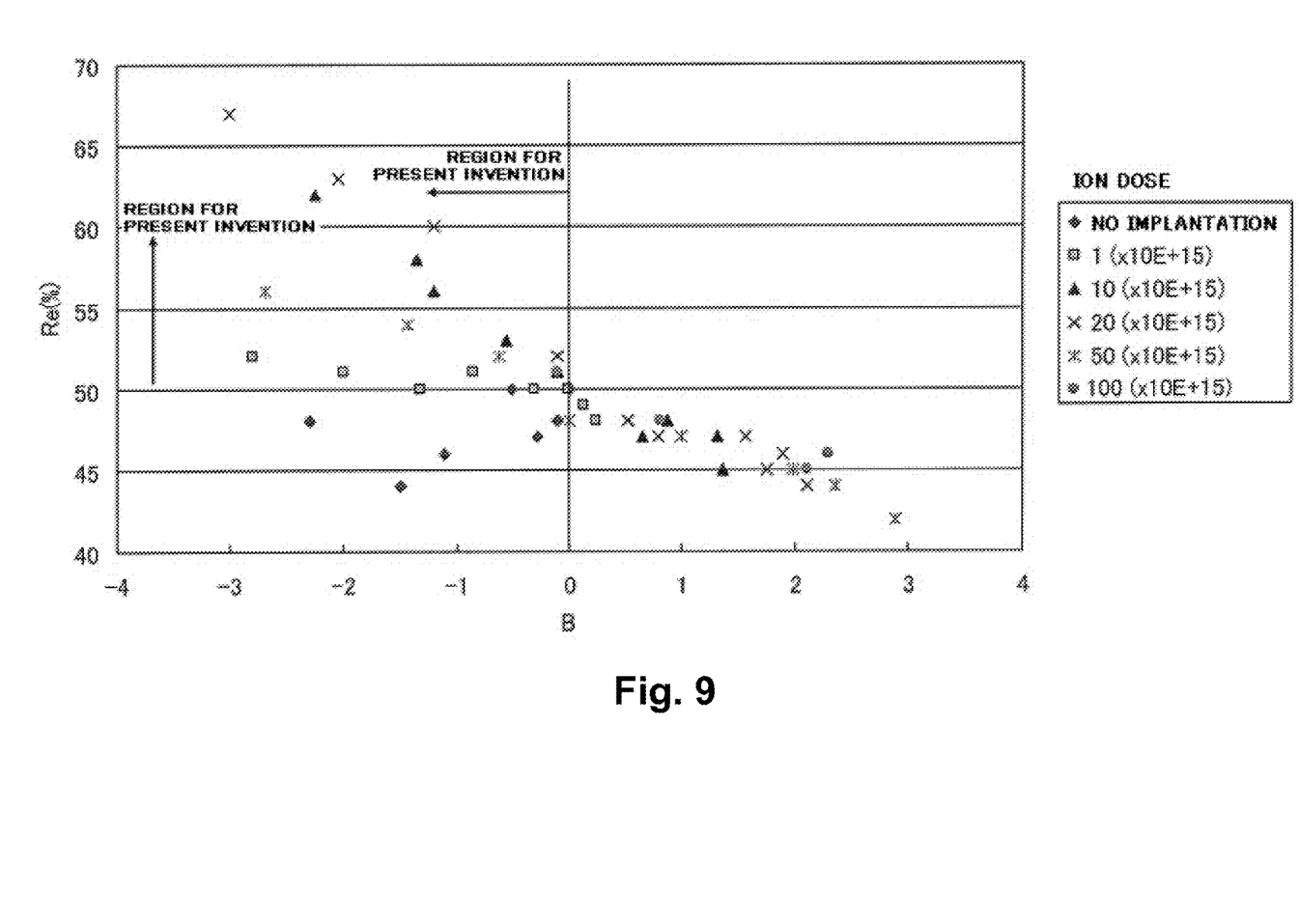
FIG. 9 is a drawing showing the relationship between the height of the ion implanted part of a Co based alloy magnetic layer (recording layer 2) in reference to the non-implanted part and the output resolution Re in a DTM.

The evaluation results of the output resolution Re are shown in TABLE 3 and FIG. 9.

ing tracks and the magnetic head was reduced, track separators remained ferromagnetic so that the magnetic flux leaked from the track separators adversely affected the read/write performance. When the Co based alloy magnetic layer (recording layer 2) 7 was etched and the ion dose was varied from 1×10E+15 to 1×10E+17 (atoms/cm$^2$), the Re was 50% or more if the height of the ion implanted part 13 of the Co based alloy magnetic layer (recording layer 2) 7 in reference to the non-implanted part was −0.1 nm or less. This is because the magnetism at the implanted part was deteriorated by the ion implantation not to cause adverse effect to the read/write performance, and the average height from the substrate surface of the ion implanted part became lower than the average height from the substrate surface of the ion non-implanted part to lower the reference flying surface of the magnetic head so that the spacing between the non-implanted part or the magnetic recording tracks to the magnetic head was reduced.

Next, bit patterned media (BPM) were prepared and evaluated in the same manner except that when forming a fine pattern according to the nanoinprinting technology after providing a methyl methacrylate resin (PMMA) layer 9 as a resist

TABLE 3

IN DTM, VALUE A VS VALUE B (nm) AND Re (%)

| | C[(×10E+15)atoms/cm2] | | | | | | | | | | | |
|---|---|---|---|---|---|---|---|---|---|---|---|---|
| | 0 | | 1 | | 10 | | 20 | | 50 | | 100 | |
| A(nm) | B | Re | B | Re | B | Re | B | Re | B | Re | B | Re |
| 0 | 0 | 50 | 0.25 | 48 | 1.3 | 47 | 2.1 | 44 | 3 | 42 | 6.66 | — |
| −0.1 | −0.1 | 48 | 0.14 | 49 | 1.35 | 45 | 1.88 | 46 | 3.2 | — | 6.5 | — |
| −0.28 | −0.28 | 47 | −0.01 | 50 | 0.87 | 48 | 1.75 | 45 | 3.22 | — | 6.72 | — |
| −0.51 | −0.51 | 50 | −0.3 | 50 | 0.65 | 47 | 1.55 | 47 | 2.89 | 42 | 6.49 | — |
| −1.1 | −1.1 | 46 | −0.85 | 51 | −0.1 | 51 | 0.79 | 47 | 2.36 | 44 | 5.84 | — |
| −1.5 | −1.5 | 44 | −1.33 | 50 | −0.55 | 53 | 0.52 | 48 | 1.98 | 45 | 5.48 | — |
| −2.3 | −2.3 | 48 | −2 | 51 | −1.2 | 56 | −0.1 | 52 | 1 | 47 | 4.65 | — |
| −3.2 | −3.2 | — | −2.8 | 52 | −1.35 | 58 | −1.2 | 60 | 0 | 48 | 3.76 | — |
| −4.1 | −4.1 | — | −3.75 | — | −2.24 | 62 | −2.05 | 63 | −0.62 | 52 | 2.29 | 46 |
| −5 | −5 | — | −4.88 | — | −3.65 | — | −3 | 67 | −1.44 | 54 | 2.1 | 45 |
| −6.3 | −6.3 | — | −6 | — | −5.02 | — | −4.25 | — | −2.68 | 56 | 0.8 | 48 |
| −7.2 | −7.2 | — | −6.98 | — | −5.76 | — | −5.11 | — | −3.56 | — | −0.1 | 51 |

The Re of a sample of a so-called continuous medium, where the Co based alloy magnetic layer (recording layer 2) 7 was not etched or ion implanted, was 50%. On the contrary, the Re of a sample where the Co based alloy magnetic layer (recording layer 2) 7 was etched to form physical track shapes but was not ion implanted was 44% to 50%, which was almost equal to or lower than the continuous medium. This is because, although the distance between the magnetic recordmaterial on the Ta pre-mask layer, the pattern was formed by stamping to form dots with its resist convex parts of 17 nm in diameter and with a dot pitch of 25 nm, and resist residues of 5 nm concentrically. According to this method, BPMs can be formed in which parts having a relatively high element ratio of the ferromagnetic material are present like islands. For convenience, applying the method used in DTMs to the Evaluation of the read/write performance, the Re was evaluated, while defining the ratio of signal outputs of 10 kilo flux change/mm (254 kFCI) to signal outputs of 40 kilo flux change/mm (1,016 kFCI) as the output resolution Re (Re (%)=S(1016 kFCI)/S(254 kFCI)×100).

Figure 10:
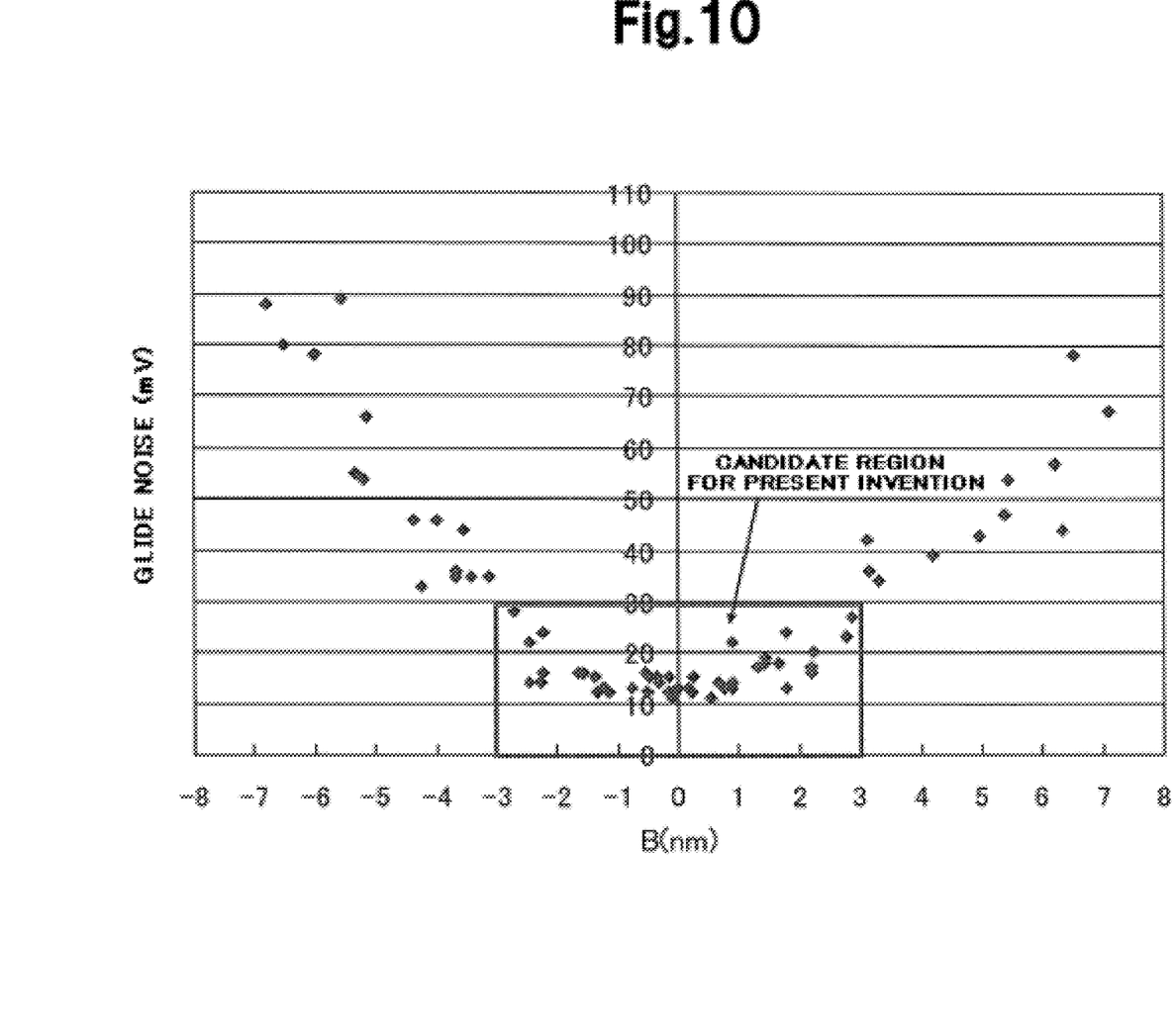
FIG. 10 is a drawing showing the relationship between the height of the ion implanted part of a Co based alloy magnetic layer (recording layer 2) in reference to the non-implanted part and the glide noise in a BPM.
Figure 11:
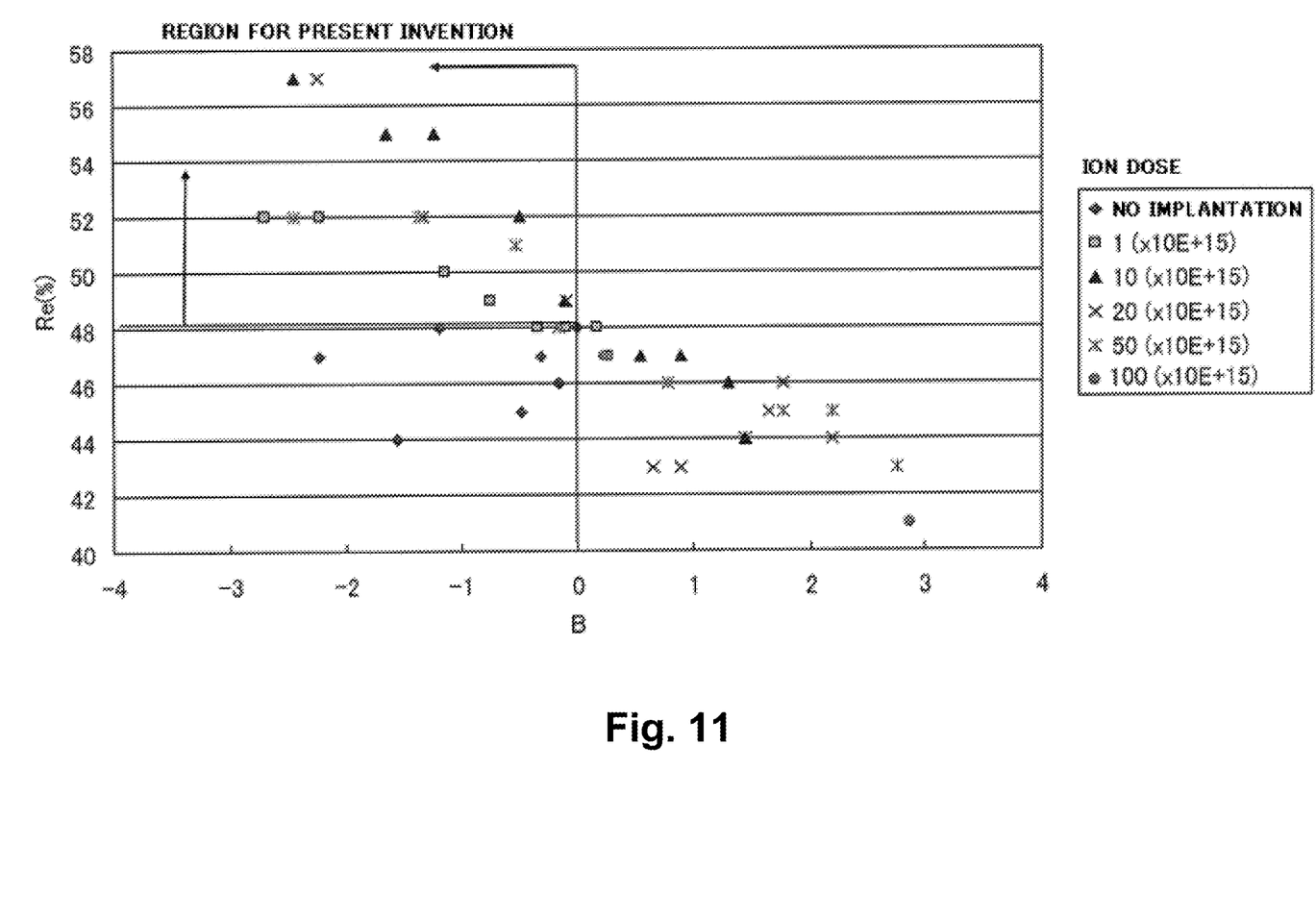
FIG. 11 is a drawing showing the relationship between the height of the ion implanted part of a Co based alloy magnetic layer (recording layer 2) in reference to the non-implanted part and the output resolution Re in a BPM.

Evaluation results of BPMs are shown in FIG. 10, TABLE 4, FIG. 11, and TABLE 5. FIG. 10 and TABLE 4 show the relationship between the height of the ion implanted part of the Co based alloy magnetic layer (recording layer 2) in reference to the non-implanted part and the glide noise. FIG. 11 and TABLE 5 show the relationship between the height of the ion implanted part of the Co based alloy magnetic layer (recording layer 2) in reference to the non-implanted part and the output resolution Re (%).

magnetic layer (recording layer 2) 7 was etched and the ion dose was varied from 1×10E+15 to 1×10E+17 (atoms/cm$^2$), the Re was 48% or more if the height of the ion implanted part 13 in reference to the non-implanted part of the Co based alloy magnetic layer (recording layer 2) 7 was −0.1 nm or less, compared with the Re of 48% in continuous media. This is because, similar to the results on DTM, that the magnetism at the implanted part was deteriorated by the ion implantation not to cause adverse effect to the read/write performance, and the average height from the substrate surface of the ion implanted part became lower than the average height from the substrate surface of the ion non-implanted part to relatively get closer to the reference flying surface of the magnetic head

TABLE 4

IN BPM, VALUE A VS VALUE B (nm) AND GLIDE NOISE

C[(×10E+15)atoms/cm2]

| | 0 | | 1 | | 10 | | 20 | | 50 | | 100 | |
|---|---|---|---|---|---|---|---|---|---|---|---|---|
| A(nm) | B | GN | B | GN | B | GN | B | GN | B | GN | B | GN |
| 0 | 0 | 13 | 0.27 | 15 | 1.3 | 17 | 2.2 | 17 | 3.32 | 34 | 7.1 | 67 |
| −0.1 | −0.15 | 15 | 0.17 | 13 | 1.45 | 18 | 1.78 | 24 | 3.15 | 36 | 6.52 | 78 |
| −0.28 | −0.31 | 14 | −0.1 | 11 | 0.9 | 14 | 1.65 | 18 | 3.11 | 42 | 6.21 | 57 |
| −0.51 | −0.48 | 15 | −0.35 | 15 | 0.55 | 11 | 1.44 | 19 | 2.76 | 23 | 6.33 | 44 |
| −1.1 | −1.2 | 13 | −0.75 | 13 | −0.11 | 12 | 0.89 | 13 | 2.2 | 16 | 5.46 | 54 |
| −1.5 | −1.55 | 16 | −1.15 | 12 | −0.5 | 12 | 0.66 | 14 | 1.78 | 13 | 5.38 | 47 |
| −2.3 | −2.23 | 24 | −2.22 | 16 | −1.24 | 13 | −0.1 | 12 | 0.78 | 13 | 4.98 | 43 |
| −3.2 | −3.4 | 35 | −2.7 | 28 | −1.65 | 16 | −1.34 | 12 | −0.15 | 12 | 4.2 | 39 |
| −4.1 | −4 | 46 | −3.55 | 44 | −2.44 | 22 | −2.25 | 14 | −0.54 | 16 | 2.22 | 20 |
| −5 | −5.2 | 54 | −4.38 | 46 | −3.68 | 35 | −3.12 | 35 | −1.37 | 15 | 2.87 | 27 |
| −6.3 | −6.5 | 80 | −6 | 78 | −5.12 | 66 | −4.23 | 33 | −2.44 | 14 | 0.88 | 22 |
| −7.2 | −7.7 | 111 | −6.78 | 88 | −5.56 | 89 | −5.33 | 55 | −3.68 | 36 | 0.23 | 12 |

TABLE 5

IN BPM, VALUE A VS VALUE B (nm) AND Re (%)

C[(×10E+15)atoms/cm2]

| | 0 | | 1 | | 10 | | 20 | | 50 | | 100 | |
|---|---|---|---|---|---|---|---|---|---|---|---|---|
| A(nm) | B | Re | B | Re | B | Re | B | Re | B | Re | B | Re |
| 0 | 0 | 48 | 0.27 | 47 | 1.3 | 46 | 2.2 | 44 | 3.32 | — | 7.1 | — |
| −0.1 | −0.15 | 46 | 0.17 | 48 | 1.45 | 44 | 1.78 | 46 | 3.15 | — | 6.52 | — |
| −0.28 | −0.31 | 47 | −0.1 | 48 | 0.9 | 47 | 1.65 | 45 | 3.11 | — | 6.21 | — |
| −0.51 | −0.48 | 45 | −0.35 | 48 | 0.55 | 47 | 1.44 | 44 | 2.76 | 43 | 6.33 | — |
| −1.1 | −1.2 | 48 | −0.75 | 49 | −0.11 | 49 | 0.89 | 43 | 2.2 | 45 | 5.46 | — |
| −1.5 | −1.55 | 44 | −1.15 | 50 | −0.5 | 52 | 0.66 | 43 | 1.78 | 45 | 5.38 | — |
| −2.3 | −2.23 | 47 | −2.22 | 52 | −1.24 | 55 | −0.1 | 49 | 0.78 | 46 | 4.98 | — |
| −3.2 | −3.4 | — | −2.7 | 52 | −1.65 | 55 | −1.34 | 52 | −0.15 | 48 | 4.2 | — |
| −4.1 | −4 | — | −3.55 | — | −2.44 | 57 | −2.25 | 57 | −0.54 | 51 | 2.22 | 39 |
| −5 | −5.2 | — | −4.38 | — | −3.68 | — | −3.12 | — | −1.37 | 52 | 2.87 | 41 |
| −6.3 | −6.5 | — | −6 | — | −5.12 | — | −4.23 | — | −2.44 | 52 | 0.88 | 39 |
| −7.2 | −7.7 | — | −6.78 | — | −5.56 | — | −5.33 | — | −3.68 | — | 0.23 | 47 |

When the height of ion implanted part 13 of the Co based alloy magnetic layer (recording layer 2) 7 in reference to the non-implanted part ranges −3 nm or more to 3 nm or less, the glide noise is 30 mV or less, and when the difference in height is more than 3 nm, the glide noise is larger than 30 mV. That is to say, similar to the DTM, the surface shape is not suitable for a magnetic recording medium unless the height of ion implanted part 13 of the Co based alloy magnetic layer (recording layer 2) 7 in reference to the non-implanted part ranges from −3 nm or more to 3 nm or less.

As to the RW performance of a sample where the height of the ion implanted part 13 of the Co based alloy magnetic layer (recording layer 2) 7 in reference to the non-implanted part ranges −3 nm or more to 3 nm or less, when the Co based alloy so that the spacing between the non-implanted part or the magnetic recording tracks to the magnetic head was reduced.

Summarizing the above results, in ion implanted recording area separated magnetic recording media, recording area separated magnetic recording media suitable for higher recording density can be achieved by lowering the average height from the substrate surface of the ion implanted parts than the average height from the substrate surface of the ion non-implanted parts by 0.1 nm or more to 3 nm or less.

The above-described ion implanted recording area separated magnetic recording medium comprises a mask layer having a fine pattern directly or through at least one thin film interposed on a magnetic recording layer. Such medium can be obtained by preliminarily etching the part to be ion implanted to make the height after ion implantation relatively lower than the non-implanted part within the range from 0.1 nm or more to 3 nm or less in producing the recording area separated magnetic recording medium with the element ratio of a ferromagnetic material relatively lowered by ion implantation.

As a method of ion implantation, not only the above-mentioned plasma beam method but the ion beam method will not affect embodiments of the present invention. As ion species, Mo, W, V, Nb, Ta, Ti, Zr, Hf, Ru, B, C, Si, Ge, Ar, Kr, Rn, or Xe may be used as well as Cr. As the means to preliminarily etch the Co based alloy magnetic layer (recording layer 2) before ion implantation, not only the above-mentioned Ar ion beam etching, but the reactive ion etching (RIE) using C-F based gas such as methane tetrafluoride ($CF_4$) will not affect embodiments of the present invention.

In forming magnetic recording separators by ion implantation, selective ion implantation to the recording layer with a reduced focus of ion beam to as small as about 30 nm or less may be applicable, instead of the method to provide the non-implanted area with a fine mask.

To relatively lower the height of ion implanted part than the ion non-implanted part by the range of 0.1 nm or more to 3 nm or less, a method to implant ions while controlling the ion energy and etching may be applicable, in addition to the method to preliminarily etch the part to be ion implanted.

What is claimed is:

1. A magnetic recording medium comprising:
a substrate;
magnetic recording layers formed on the substrate;
the magnetic recording layers both include parts with a relatively higher element ratio of a ferromagnetic material, and parts with a relatively lower element ratio of a ferromagnetic material, which are provided periodically in the in-plane direction,
an average height from a substrate surface of the parts with a relatively higher element ratio of a ferromagnetic material is higher than an average height from the substrate surface of the parts with a relatively lower element ratio of a ferromagnetic material, by between about 0.1-3 nm; and
a nonmagnetic element is ion implanted into the parts with a relatively lower element ratio of the ferromagnetic material, and the nonmagnetic element extends through an uppermost one of the magnetic recording layers, and only partially through a magnetic recording layer beneath said uppermost one of the magnetic recording layers.

2. The magnetic recording medium according to claim 1, wherein the magnetic recording medium is a discrete track type in which the parts with a relatively higher element ratio of the ferromagnetic material and the parts with a relatively lower element ratio of the ferromagnetic material are continuous in the circumferential direction and periodic in the radial direction.

3. The magnetic recording medium according to claim 1, wherein the magnetic recording medium further comprises an adhesion layer, a soft magnetic layer, a seed layer, an intermediate layer, the magnetic recording layer comprises two layers, and a pre-mask layer.

4. The magnetic recording medium according to claim 3, wherein the adhesion layer is AlTi, the seed layer is NiW, the intermediate layer is Ru, the magnetic recording layer comprises two Co-based alloy granular magnetic layers, and the pre-mask layer is Ta.

5. The magnetic recording medium according to claim 3, wherein the soft magnetic layer is a laminated film of a lower soft magnetic layer, an antiferromagnetic coupling layer, and an upper soft magnetic layer.

6. The magnetic recording medium according to claim 5, wherein the lower and upper soft magnetic layers are FeCo-based, and the antiferromagnetic coupling layer is Ru.

7. A magnetic recording medium comprising:
a substrate, an adhesion layer, a soft magnetic layer, a seed layer, an intermediate layer, a magnetic recording layer, and a pre-mask layer;
the magnetic recording layer includes parts with a relatively higher element ratio of a ferromagnetic material, and parts with a relatively lower element ratio of a ferromagnetic material, which are provided periodically in the in-plane direction;
an average height from a substrate surface of the parts with the relatively higher element ratio of the ferromagnetic material is higher than an average height from the substrate surface of the parts with the relatively lower element ratio of the ferromagnetic material,
by between about 0.1-3 nm;
the magnetic recording medium is a discrete track type in which the parts with the relatively higher element ratio of the ferromagnetic material and the parts with the relatively lower element ratio of the ferromagnetic material are continuous in the circumferential direction and periodic in the radial direction; and
a nonmagnetic element is ion implanted into the parts with a relatively lower element ratio of the ferromagnetic material; and
the nonmagnetic element extends through an uppermost one of the magnetic recording layers, and only partially through a magnetic recording layer beneath said uppermost one of the magnetic recording layers.

8. The magnetic recording medium according to claim 7, wherein the adhesion layer is AlTi, the seed layer is NiW, the intermediate layer is Ru, the magnetic recording layer comprises two Co-based alloy granular magnetic layers, and the pre-mask layer is Ta.

9. The magnetic recording medium according to claim 7, wherein the soft magnetic layer is a laminated film of a lower soft magnetic layer, an antiferromagnetic coupling layer, and an upper soft magnetic layer.

10. The magnetic recording medium according to claim 9, wherein the lower and upper soft magnetic layers are FeCo-based, and the antiferromagnetic coupling layer is Ru.

11. A magnetic recording medium comprising:
a substrate;
magnetic recording layers formed on the substrate;
the magnetic recording layers both include parts with a relatively higher element ratio of a ferromagnetic material, and parts with a relatively lower element ratio of a ferromagnetic material, which are provided periodically in the in-plane direction; and
a nonmagnetic element is ion implanted into the parts with the relatively lower element ratio of the ferromagnetic material, and that a height of the ion implanted parts relative to a height of the non-implanted parts is within the range of −3 nm or more to 3 nm or less, such that the magnetic recording medium has a glide noise is 30 mV or less.

12. The magnetic recording medium according to claim 11, wherein the magnetic recording medium is a discrete track type in which the parts with the relatively higher element ratio of the ferromagnetic material and the parts with the relatively lower element ratio of the ferromagnetic material are continuous in the circumferential direction and periodic in the radial direction.

* * * * *